United States Patent
Iseda et al.

(10) Patent No.: US 9,057,334 B2
(45) Date of Patent: Jun. 16, 2015

(54) VEHICLE, AND CONTROL METHOD FOR VEHICLE

(71) Applicants: Mitsuru Iseda, Toyota (JP); Satoru Katoh, Nisshin (JP); Kenji Yamada, Komaki (JP)

(72) Inventors: Mitsuru Iseda, Toyota (JP); Satoru Katoh, Nisshin (JP); Kenji Yamada, Komaki (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 388 days.

(21) Appl. No.: 13/741,966

(22) Filed: Jan. 15, 2013

(65) Prior Publication Data

US 2013/0191006 A1    Jul. 25, 2013

(30) Foreign Application Priority Data

Jan. 19, 2012    (JP) .................................. 2012-009095

(51) Int. Cl.
| | | |
|---|---|---|
| *F02D 45/00* | (2006.01) | |
| *B60L 3/00* | (2006.01) | |
| *B60L 3/10* | (2006.01) | |
| *B60L 15/02* | (2006.01) | |

(52) U.S. Cl.
CPC .............. *F02D 45/00* (2013.01); *B60L 3/0023* (2013.01); *B60L 3/0061* (2013.01); *B60L 3/104* (2013.01); *B60L 15/025* (2013.01); *B60L 2250/10* (2013.01); *Y02T 10/643* (2013.01)

(58) Field of Classification Search
CPC ........ F02D 45/00; B60L 3/104; B60L 3/0061

USPC ................................... 701/110; 318/798, 811
See application file for complete search history.

(56) References Cited

U.S. PATENT DOCUMENTS

| 6,274,998 B1 * | 8/2001 | Kaneko et al. ................ 318/802 |
| 2007/0187158 A1 | 8/2007 | Muta et al. | |

FOREIGN PATENT DOCUMENTS

| JP | A-02-179297 | 7/1990 |
| JP | A-7-115788 | 5/1995 |
| JP | A-2007-221894 | 8/2007 |
| JP | A-2008-109719 | 5/2008 |
| JP | A-2011-030352 | 2/2011 |

* cited by examiner

*Primary Examiner* — Hai Huynh
(74) *Attorney, Agent, or Firm* — Oliff PLC

(57) ABSTRACT

A control device includes a PWM control unit that executes PWM control over an alternating-current motor mounted on a vehicle. The PWM control unit includes an alarm sound generation processing unit and a slip determination unit. The slip determination unit determines whether a drive wheel coupled to the alternating-current motor is slipping on the basis of a d-axis current (Id), a q-axis current (Iq), a d-axis voltage command value (Vd) and a q-axis voltage command value (Vq) of the alternating-current motor. When the drive wheel is not slipping, the alarm sound generation processing unit generates an alarm sound from the alternating-current motor by adding a variation value (ΔV) to the d-axis voltage command value (Vd) at a predetermined interval. When the drive wheel is slipping, the alarm sound generation processing unit temporarily stops adding the variation value (ΔV) to the d-axis voltage command value (Vd).

7 Claims, 6 Drawing Sheets

VEHICLE, AND CONTROL METHOD FOR VEHICLE

INCORPORATION BY REFERENCE

The disclosure of Japanese Patent Application No. 2012-009095 filed on Jan. 19, 2012 including the specification, drawings and abstract is incorporated herein by reference in its entirety.

BACKGROUND OF THE INVENTION

1. Field of the Invention

The invention, relates to a vehicle that includes an alternating-current motor that is controlled through pulse width modulation (hereinafter, also referred to as "PWM") control.

2. Description of Related Art

An output torque of a motor that is mounted on an electromotive vehicle, such as an electric vehicle, a hybrid vehicle and a fuel-cell vehicle, is generally controlled through PWM control. In this PWM control, a pulse width modulation voltage is applied to the motor from an inverter by turning on or off switching elements of the inverter on the basis of a voltage comparison between a carrier wave signal (carrier signal) and a voltage command.

Japanese Patent Application Publication No. 2-179297 (JP 2-179297 A) describes the following technique. That is, when there occurs an abnormality in a motor, a control period and control frequency of the inverter through PWM control are changed. By so doing, an electromagnetic sound that is generated from the motor is changed by changing a ripple frequency of phase current flowing through the motor. Japanese Patent Application Publication No. 2-179297 discloses the technique for informing a user of an abnormality of the motor through a change of the electromagnetic sound.

In a vehicle that includes an alternating-current motor that is controlled through PWM control, it is possible to intentionally generate a sound from the motor by periodically changing phase current flowing through the motor. However, if the rotation speed of the motor steeply varies due to a slip, or the like, of a drive wheel, phase current flowing through the motor may be in an overcurrent state in which phase current exceeds a permissible value. However, JP 2-179297 A does not describe such a problem and its solution.

SUMMARY OF THE INVENTION

The invention provides a vehicle that includes an alternating-current motor that is controlled through PWM control and that suppresses an overcurrent of the motor due to generation of an alarm sound from the alternating-current motor, and a control method for the vehicle.

A first aspect of the invention relates to a vehicle including: an alternating-current motor that is coupled to a wheel of the vehicle; and a control device that controls the alternating-current motor through pulse width modulation control. When the wheel is not slipping on a road, the control device varies phase current flowing through the alternating-current motor by periodically adding a variation value to a voltage command value of the alternating-current motor so as to generate a sound from the alternating-current motor, and when the wheel is slipping on a road, the control device stops adding the variation value to the voltage command value.

A second aspect of the invention relates to a control method for a vehicle, including an alternating-current motor that is controlled through pulse width modulation control and a wheel that is coupled to the motor. The control method includes: determining whether the wheel is slipping on a road; and varying phase current flowing through the alternating-current motor by periodically adding a variation value to a voltage command value of the alternating-current motor, so as to generate a sound from the alternating-current motor when the wheel is not slipping on a road, and stopping adding the variation value to the voltage command value, when the wheel is slipping on a road.

According to the above aspects, in a vehicle that includes an alternating-current motor that is controlled through PWM control, it is possible to suppress an overcurrent of the alternating-current motor due to generation of an alarm sound from the alternating-current motor.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
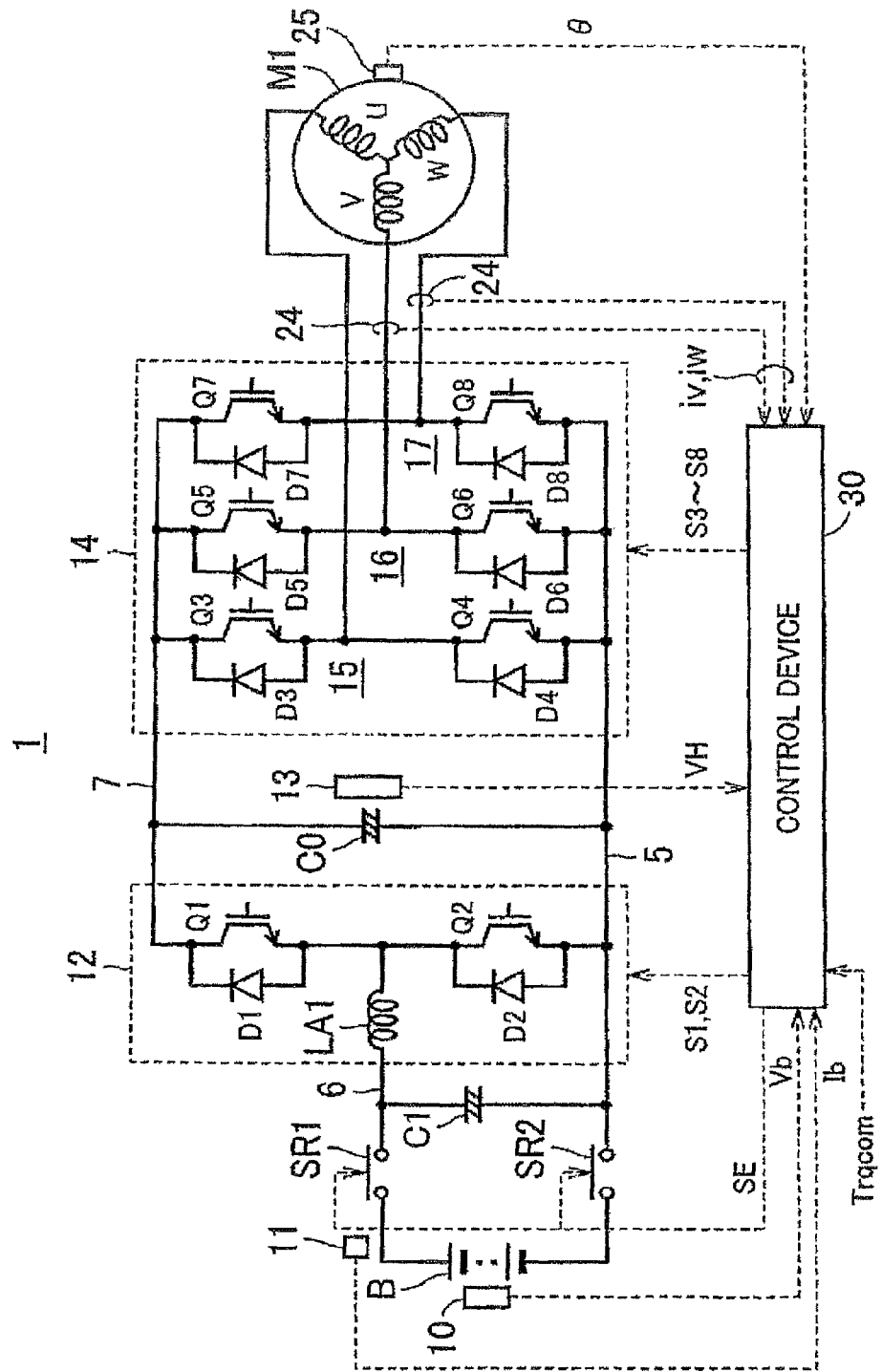
FIG. 1 is an overall configuration view of a vehicle.

Hereinafter, an embodiment of the invention will be described in detailed with reference to the accompanying drawings. Like reference numerals denote the same or corresponding components in the drawings and the redundant description thereof will be omitted.

FIG. 1 is an overall configuration view of a vehicle 1 according to the embodiment of the invention. The vehicle 1 is an electromotive vehicle an automobile, such as a hybrid vehicle, an electric vehicle and a fuel-cell vehicle, that travels on driving force obtained from electric energy).

The vehicle 1 includes a direct-current power supply B, system relays SR1 and SR2, smoothing capacitors C0 and C1, a converter 12, an inverter 14, a motor M1 and a control device 30.

The motor M1 is an alternating-current motor, and is typically a three-phase (U-phase, V-phase and W-phase) permanent magnet synchronous motor. The motor M1 may mainly function as a drive motor that generates driving force for driving the vehicle 1. Alternatively, the motor M1 may mainly function as a generator that generates electric power for driving a drive motor.

The direct-current power supply B is typically formed of a secondary battery, such as a nickel metal hydride battery and a lithium ion battery, or an electrical storage device, such as an electric double layer capacitor. A direct-current voltage Vb that is output from the direct-current power supply B is detected by a voltage sensor 10. A direct current Ib that is input to or output from the direct-current power supply B is detected by a current sensor 11.

The system relay SR1 is connected between a positive electrode terminal of the direct-current power supply B and a positive electrode line 6. The system relay SR2 is connected between a negative electrode terminal of the direct-current power supply B and a negative electrode line 5. The system relays SR1 and SR2 are turned on or off by a signal SE from the control device 30.

The converter 12 includes a reactor LA1, switching elements Q1 and Q2 and diodes D1 and D2. The switching elements Q1 and Q2 are serially connected between a positive electrode line 7 and the negative electrode line 5. The reactor LA1 is connected between a connection node of the switching elements Q1 and Q2, and the positive electrode line 6. In addition, the smoothing capacitor C0 is connected between the positive electrode line 7 and the negative electrode line 5.

The converter 12 is basically controlled such that the switching elements Q1 and Q2 complementarily and alternately change on/off states within each switching period. During step-up operation, the converter 12 steps up the direct-current voltage Vb, which is output from the direct-current power supply B, to a direct-current voltage VH. During step-down operation, the converter 12 steps down the direct-current voltage VH to the direct-current voltage Vb. Changing the on/off states of the switching elements Q1 and Q2 is controlled by control signals S1 and S2 from the control device 30.

The smoothing capacitor C0 smoothes the direct-current voltage from the converter 12, and supplies the smoothed direct-current voltage to the inverter 14. The voltage sensor 13 detects the voltage between both ends of the smoothing capacitor C0, that is, the direct-current voltage VH, and outputs the detected value to the control device 30.

The inverter 14 is connected between the positive electrode line 7 and the negative electrode line 5. The inverter 14 is formed of a U-phase upper/lower arm 15, a V-phase upper/lower arm 16 and a W-phase upper/lower arm 17. The U-phase upper/lower arm 15, the V-phase upper/lower arm 16 and the W-phase upper/lower arm 17 are provided in parallel each other between the positive electrode line 7 and the negative electrode line 5. Each phase upper/lower arm is formed of switching elements that are serially connected between the positive electrode line 7 and the negative electrode line 5. For example, the U-phase upper/lower arm 15 is formed of switching elements Q3 and Q4. The V-phase upper/lower arm 16 is formed of switching elements Q5 and Q6. The W-phase upper/lower arm 17 is formed of switching elements Q7 and Q8. Diodes D3 to D8 are respectively connected in antiparallel with the switching elements Q3 to Q8. The other end of each phase coil of the motor M1 is connected to a neutral point between the switching elements of each of the phase upper/lower arms 15 to 17. Changing on/off states of the switching elements Q3 to Q8 is controlled by control signals S3 to S8 from the control device 30.

When causing the motor M1 to function as a motor, the inverter 14 converts direct-current voltage that is supplied from the smoothing capacitor C0 to alternating-current voltages through switching operation in response to the control signals S3 to S8 from the control device 30. when causing the motor M1 to function as a generator, the inverter 14 converts alternating-current voltages, regenerated by the motor M1 through switching operation in response to the control signals S3 to S8, to direct-current voltage. Then, the inverter 14 supplies direct-current voltage, converted via the smoothing capacitor C0, to the converter 12.

The current sensor 24 detects phase currents (U-phase current iu, V-phase current iv and W-phase current iw) that flow through the motor M1. The current sensor 24 outputs detected current values to the control device 30. Note that the sum of instantaneous values of the U-phase current iu, V-phase current iv and W-phase current iw is zero. Therefore, as shown in FIG. 1, the current sensor 24 is, for example, arranged so as to detect only the V-phase current iv and the W-phase current iw.

A resolver 25 detects a rotor rotation angle θ of the motor M1. The resolver 25 outputs the detected rotation angle θ to the control device 30. The control device 30 calculates the rotation speed of the motor M1 on the basis of the rotation angle θ.

The control device 30 is formed of an electronic control unit (ECU) that incorporates a central processing unit (CPU) and a memory (which are not shown). The control device 30 executes predetermined computation processes on the basis of information and programs, which are stored in the memory. By so doing, the control device 30 controls operations of devices of the vehicle 1.

As a typical function of the control device 30, the operations of the converter 12 and inverter 14 are controlled on the basis of a torque command value Trqcom that is set on the basis of a user's request, or the like, and detected results of the sensors such that the motor M1 outputs a torque according to the torque command value Trqcom. That is, the control device 30 generates control signals S1 to S8 for controlling the converter 12 and the inverter 14 as described above and outputs the control signals S1 to S8 to the converter 12 and the inverter 14.

Figure 2:
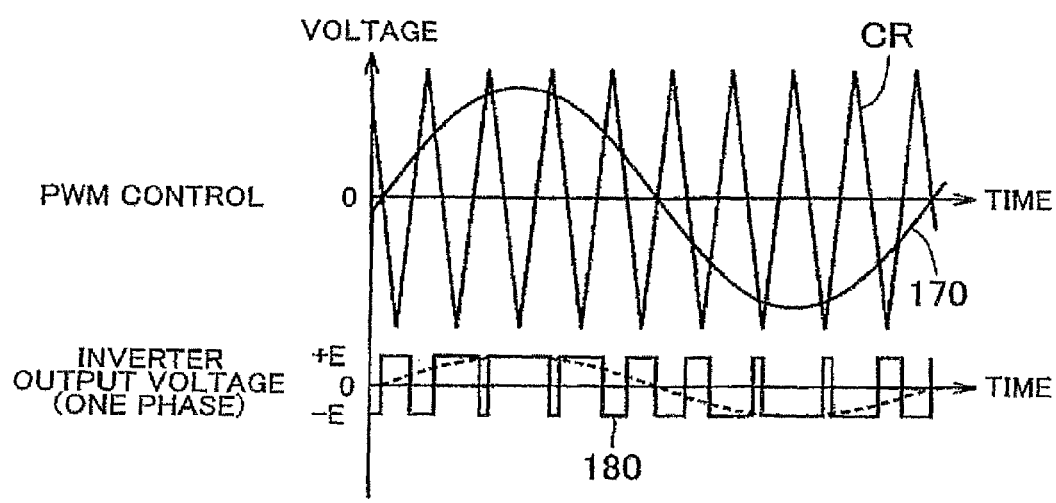
FIG. 2 is a graph that schematically shows a mode of PWM control of an alternating-current motor.

FIG. 2 is a graph that schematically shows a mode of PWM control of the motor M1 (inverter 14). As shown in FIG. 2, in PWM control, the on/off states of the switching elements for the respective phases of the inverter 14 are controlled on the basis of results obtained by comparing a voltage comparison between a carrier signal CR with a phase voltage command value 170 (which corresponds to phase voltage command values Vu, Vv and Vw described later) phase by phase. By so doing, a pulse width modulation voltage 180 that is a pseudo-sinusoidal wave voltage is applied to each phase of the motor M1. The carrier signal CR may be formed of a triangular wave or a sawtooth wave. FIG. 2 illustrates a configuration that uses a triangular wave.

In the thus configured vehicle 1, when the control device 30 executes PWM control over the motor M1, the control device 30 adds a variation value ΔV to a d-axis voltage command value Vd (described later) at a predetermined interval. By so doing, the control device 30 generates a sound from the motor M1 by intentionally varying phase current flowing through the motor M1. This sound is a sound for informing a pedestrian, or the like, of the approach of the vehicle 1 (hereinafter, referred to as "alarm sound").

For example, if a drive wheel coupled to the motor M1 slips and/or grips (a slip stops) against a road surface and, as a result, the rotation speed of the motor M1 steeply varies. The d-axis voltage command value Vd also significantly varies as described later. In this way, in a state where the d-axis voltage command value Vd significantly varies, the variation value ΔV is added to the d-axis voltage command value Vd in order to generate an alarm sound. After the variation value ΔV is added to the d-axis voltage command value Vd, the sum of the d-axis voltage command value Vd and the variation value ΔV may exceed a permissible range and an overcurrent may occur in the motor M1.

The control device 30 according to the present embodiment determines whether the drive wheel coupled to the motor M1 is slipping, and, when the drive wheel is slipping, temporarily stops adding the variation value ΔV to the d-axis voltage command value Vd (that is, temporarily stops generating an alarm sound). By so doing, occurrence of an overcurrent in the motor M1 is suppressed.

Figure 3:
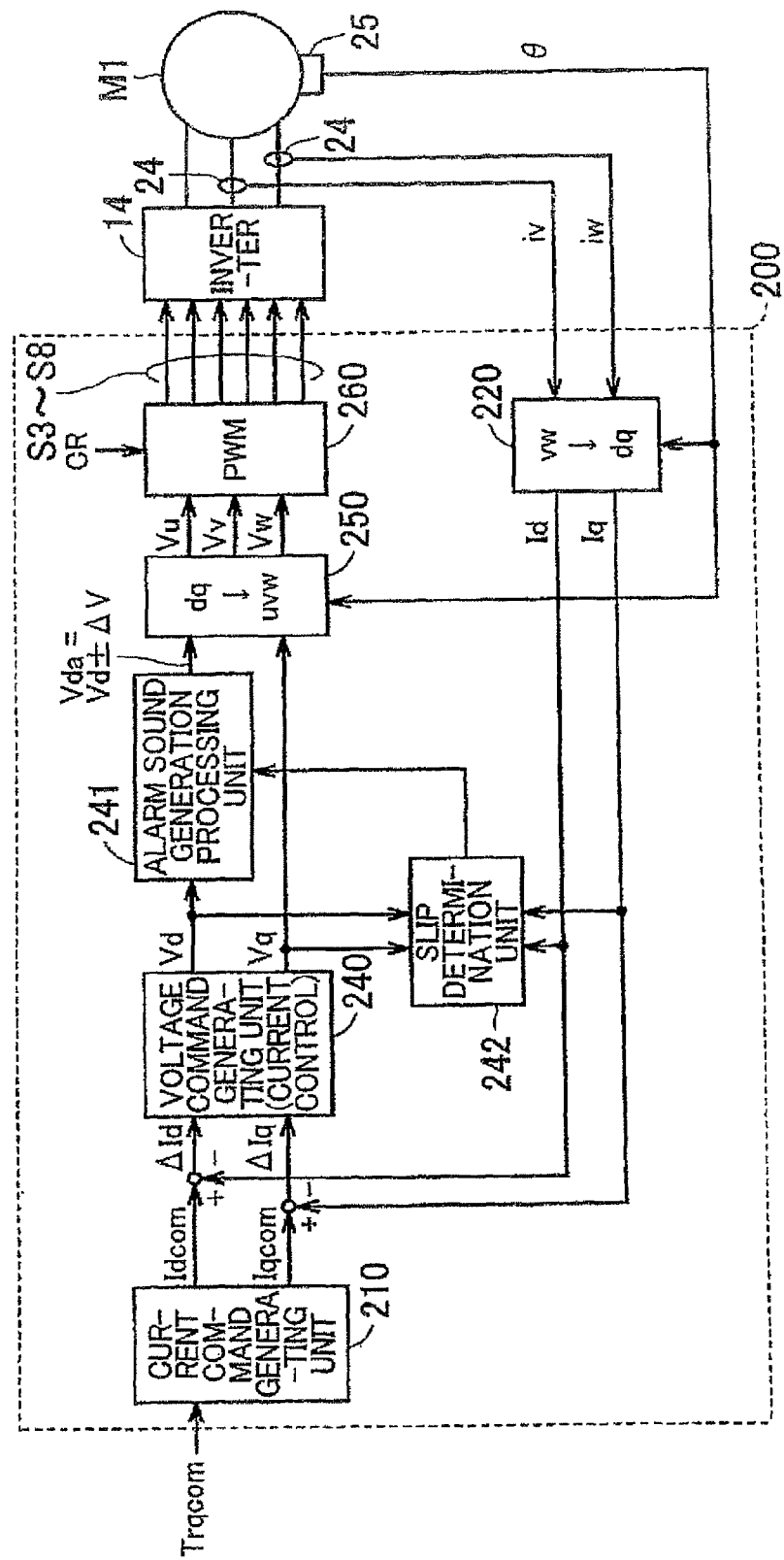
FIG. 3 is a functional block diagram of a control device.

FIG. 3 is a functional block diagram of a portion relating to PWM control in the control device 30. The functional blocks shown in FIG. 3 may be implemented by hardware or may be implemented by software.

PWM control is executed by a PWM control unit 200. The PWM control unit 200 is included in the control device 30. The PWM control unit 200 includes a current command generating unit 210, coordinate conversion units 220 and 250, a voltage command generating unit 240, an alarm sound generation processing unit 241, a slip determination unit 242 and a PWM modulation unit 260.

The current command generating unit 210 generates a d-axis current command value Idcom and a q-axis current command value Iqcom that correspond to the torque command value Trqcom in accordance with a map, or the like, prepared in advance.

The coordinate conversion unit 220 executes coordinate conversion (three phases of U, V and W phases to two phases of d and q axes) using the rotor rotation angle θ. The rotor rotation angle θ is detected by the resolver 25. The coordinate conversion unit 220 converts the V-phase current iv and the W-phase current iw to a d-axis current Id and a q-axis current Iq (two-phase conversion). The V-phase current iv and the W-phase current iw are detected by the current sensor 24.

A deviation ΔId (ΔId=Idcom−Id) between the d-axis current command value Idcom and the d-axis current Id and a deviation ΔIdq (ΔIq=Iqcom−Iq) between the q-axis current command value Idcom and the q-axis current Iq are input to the voltage command generating unit 240.

The voltage command generating unit 240 executes current feedback control so as to bring the d-axis current Id and the q-axis current Iq close to the d-axis current command value Idcom and the q-axis current command value Iqcom, respectively. The voltage command generating unit 240 calculates the d-axis voltage command value Vd and a q-axis voltage command value Vq. Specifically, the voltage command generating unit 240 obtains control deviations by executing, for example, proportional-plus-integral (PI) control over each of the deviations ΔId and ΔIq. The voltage command generating unit 240 generates the d-axis voltage command value Vd and the q-axis voltage command value Vq that have been subjected to current feedback are generated on the basis of the control deviations. The d-axis voltage command value Vd and the q-axis voltage command value Vq correspond to voltage values that are converted (two-phase-converted) from a U-phase voltage command Vu, a V-phase voltage command Vv and a W-phase voltage command Vw into d and q axes.

The voltage command generating unit 240 outputs the d-axis voltage command value Vd to the alarm sound generation processing unit 241 and the slip determination unit 242, and outputs the q-axis voltage command value Vq to the coordinate conversion unit 250 and the slip determination unit 242.

The slip determination unit 242 determines whether the drive wheel coupled to the motor M1 starts slipping and whether the drive wheel starts gripping (stops slipping) on the basis of the d-axis current Id, the q-axis current Iq, the d-axis voltage command value Vd and the q-axis voltage command value Vq. By so doing, it is determined that the drive wheel is slipping in a period from a start of a slip to a start of a grip.

Figure 4A:
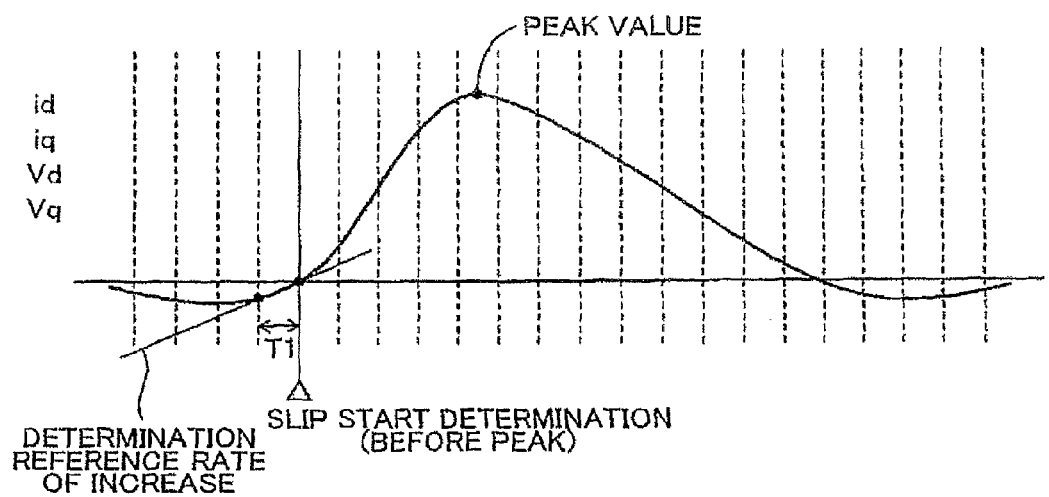
FIG. 4A is a view that illustrates an example of a method of determining a start of a slip.
Figure 4B:
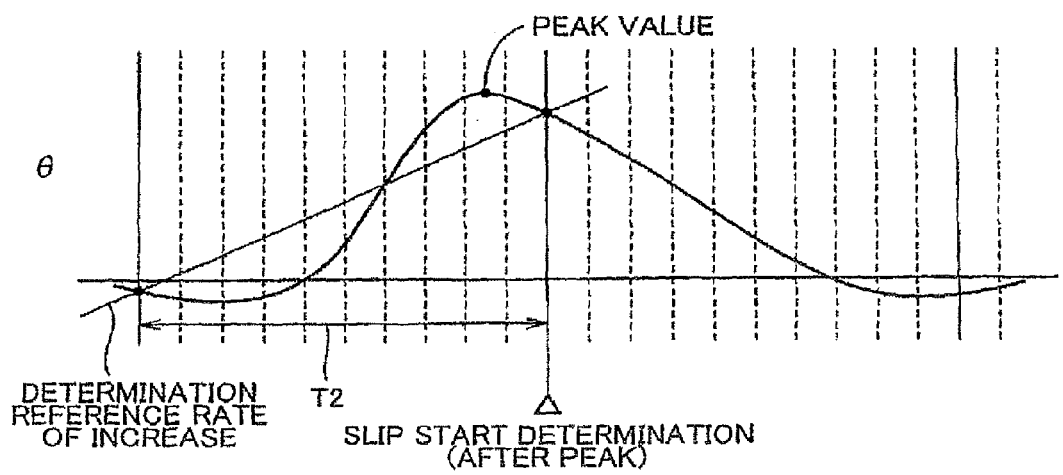
FIG. 4B is a view that illustrates an example of a method of determining a start of a slip.

FIG. 4A and FIG. 4B are views that illustrate examples of methods of determining a start of a slip by the slip determination unit 242. FIG. 4A is a view that shows a method of determining a start of a slip (slip determination method using Id, Iq, Vd and Vq) by the slip determination unit 242 according to the present embodiment. FIG. 4B is a view that shows a method of determining a start of a slip using the rotor rotation angle θ as a reference.

The slip determination unit 242 determines a start of a slip by monitoring variations of Id, Iq, Vd and Vq. For example, as shown in FIG. 4A, the slip determination unit 242 computes a rate of change of each of parameters, that is, Id, Iq, Vd and Vq, at a control period T1 (for example, 100 μs). The slip determination unit 242 determines that the drive wheel starts slipping in the case where a rate of increase in at least one of the parameters has changed from a value smaller than the corresponding slip start determination reference rate of increase to a value larger than the corresponding slip start determination reference rate of increase.

Here, the control period Ti of Id, Iq, Vd and Vq is set to a value shorter than a control period T2 (for example, 1 ms) of the rotor rotation angle θ. Therefore, in comparison with the case where a start of a slip is determined using a rate of increase in the rotor rotation angle θ (see FIG. 4B), determination as to a start of a slip becomes early. Therefore, it is possible to determine a start of slip before the time point at which each parameter becomes a peak value (time point at which a current deviation becomes a peak). Thus, it is possible to suppress overlooking of a current deviation peak due to a delay of determination as to a start of a slip.

Similarly, the slip determination unit 242 determines a start of a grip (a stop of a slip) by monitoring variations of Id, Iq, Vd and Vq. For example, the slip determination unit 242 computes a rate of change of each of the parameters, that is, Id, Iq, Vd and Vq, at the control period T1. The slip determination unit 242 determines that the drive wheel starts gripping in the case where a rate of reduction in at least one of the parameters has changed from a value larger than the corresponding grip start determination reference rate of reduction to a value smaller than the corresponding grip start determination reference rate of reduction. The slip determination unit 242 determines that the drive wheel is slipping in a period from a start of a slip to a start of a grip.

Note that variations in all the parameters, that is, Id, Iq, Vd and Vq, do not always need to be monitored. For example, in order to prevent an overcurrent, a slip may be determined on the basis of results that a variation in current (at least one of the d-axis current Id and the q-axis current Iq) is monitored without monitoring variations in voltages (the d-axis voltage command value Vd and the q-axis voltage command value Vq). In addition, it is applicable that the absolute values of Id, Iq, Vd and Vq are monitored instead of the rates of change in Id, Iq, Vd and Vq and then a start of a slip and a start of a grip are determined on the basis of results of comparison between the absolute values of Id, Iq, Vd and Vq and corresponding reference values. Alternatively, it is also applicable that the absolute values of Id, Iq, Vd and Vq are monitored in addition to the rates of change in Id, Iq, Vd and Vq and then a start of a slip and a start of a grip are determined on the basis of results of comparison between the absolute values of Id, Iq, Vd and Vq and corresponding reference values.

Referring back to FIG. 3, the alarm sound generation processing unit 241 determines whether to execute a process for generating an alarm sound from the motor M1 (hereinafter, also referred to as "alarm sound generating process") on the d-axis voltage command value Vd. The alarm sound generation processing unit 241 determines whether to execute the alarm sound generating process on the basis of whether the slip determination unit 242 has determined that the drive wheel is slipping.

When the drive wheel is not slipping, the alarm sound generation processing unit 241 executes the alarm sound generating process on the d-axis voltage command value Vd. That is, when the wheel is gripping (is not slipping), the alarm sound generation processing unit 241 executes the alarm sound generating process on the d-axis voltage command value Vd. Specifically, the alarm sound generation processing unit 241 sets a value, which is obtained by adding the variation value ΔV to the d-axis voltage command value Vd at a predetermined period, as a d-axis voltage command value Vda resulting from the alarm sound generating process. Then, the alarm sound generation processing unit 241 outputs the d-axis voltage command value Vda resulting from the alarm sound generating process to the coordinate conversion unit 250.

On the other hand, when the drive wheel is slipping, the alarm sound generation processing unit 241 temporarily stops the alarm sound generating process. This point will be described in detail later.

When the drive wheel is not slipping any longer after a temporary stop of the alarm sound generating process (when a grip start determination has been made), the alarm sound generation processing unit 241 cancels a temporary stop of the alarm sound generating process, and resumes the alarm sound generating process.

Note that a target to be subjected to the alarm sound generating process is not limited to the d-axis voltage command value Vd. For example, the q-axis voltage command value Vq may be subjected to the alarm sound generating process instead of the d-axis voltage command value Vd. Alternatively, the q-axis voltage command value Vq may also be subjected to the alarm sound generating process in addition to the d-axis voltage command value Vd. Even when the drive wheel is not slipping (is gripping), it is not necessary to execute the alarm sound generating process. For example, when the vehicle 1 is a hybrid vehicle that includes an engine and a drive motor, it is applicable that the alarm sound generating process is executed during an engine stop in which no engine sound is generated (during travelling with the use of the drive motor) and the alarm sound generating process is not executed during engine operation.

The coordinate conversion unit 250 converts the d-axis voltage command value Vda and the q-axis voltage command value Vq to a U-phase voltage command Vu, a v-phase voltage command Vv and a W-phase voltage command Vw (three-phase conversion) by performing coordinate conversion (two phases of d and q axes to three phases of U, V and W phases) using the rotor rotation angle θ.

The PWM modulation unit 260 generates the control signals S3 to S8 of the inverter 14 in accordance with a voltage comparison between the carrier signal CR and the phase voltage command values Vu, Vv and Vw (which correspond to the phase voltage command value 170 shown in FIG. 2) from the coordinate conversion unit 250. The inverter 14 changes the on/off states of each phase upper/lower arm elements provided for the inverter 14 in accordance with the control signals S3 to S8. By so doing, a pseudo-sinusoidal wave voltage corresponding to the pulse width modulation voltage 180 shown in FIG. 2 is applied to each phase of the motor M1. By so doing, phase currents in, iv and iw flow through the motor M1.

Figure 5:
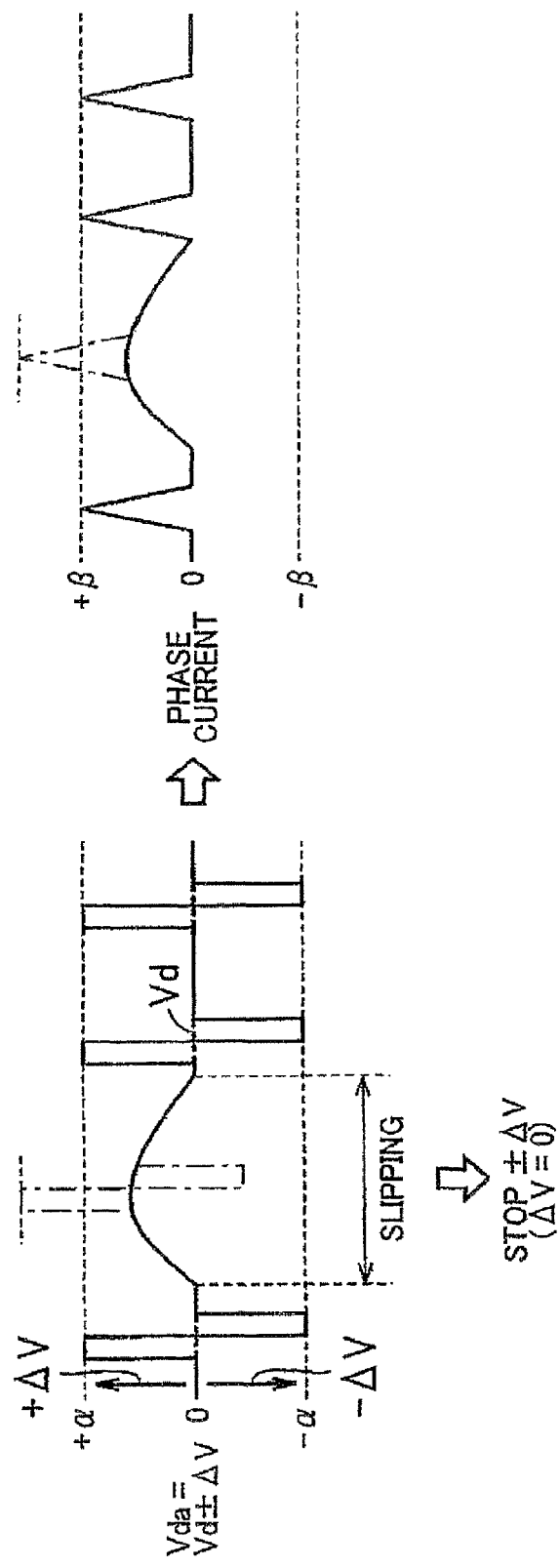
FIG. 5 is a timing chart of a d-axis voltage command value Vda.

FIG. 5 is a timing chart of the d-axis voltage command value Vda resulting from the alarm sound generating process and that is set by the alarm sound generation processing unit 241. Note that, in FIG. 5, a permissible range of the d-axis voltage command value Vda is set to a range between ±α volts (permissible upper limit=+α, permissible tower limit=−α).

Then, the case where a permissible range of phase currents of the motor M1 is a range between ±β amperes (permissible upper limit +β, permissible lower limit=−β) is shown.

As described above, when the drive wheel is not slipping, the alarm sound generation processing unit 241 adds the variation value ΔV (in the example shown in FIG. 5, a pseudo-sinusoidal variation value of ±ΔV) to the d-axis voltage command value Vd that has been subjected to current feedback at the predetermined interval, and sets the obtained value as the d-axis voltage command value Vda resulting from the alarm sound generating process (hereinafter, also referred to as Vd variation through the alarm sound generating process). By so doing, an alarm sound is generated from the motor M1 by varying phase current flowing through the motor M1.

When the drive wheel is not slipping, the d-axis voltage command value Vd that has been subjected to current feedback is stable at about 0 volts. In this case, the alarm sound generation processing unit 241 sets the variation value ΔV to about "α". As a result, the maximum value (=Vd+ΔV) and minimum value (=Vd−ΔV) of the d-axis voltage command value Vda resulting from the alarm sound generating process respectively substantially coincide with the permissible upper limit (=+α) and the permissible lower limit (=−α). By so doing, it is possible to increase the variation value of the d-axis voltage command value Vda to about maximum while bringing the d-axis voltage command value Vda within the permissible range. As a result, phase current flowing through the motor M1 varies by a large amount within the range smaller than the permissible upper limit (=+β), and it is possible to generate a larger alarm sound from the motor M1.

On the other hand, when the drive wheel is slipping, the rotation speed of the motor M1 steeply varies, and phase current flowing through the motor M1 varies due to the counter electromotive force of the motor M1. Therefore, the d-axis current Id and the deviation ΔId also sequentially vary. Thus, as shown in FIG. 5, the d-axis voltage command value Vd also significantly varies (note that FIG. 5 shows an example in which Vd is increasing above 0 volts). In this case, when the Vd variation through the alarm sound generating process is continued, the maximum value (=Vd+α) of the d-axis voltage command value Vda resulting from the alarm sound generating process exceeds the permissible upper limit (=+α). Then, it is assumed to be in an overcurrent state where phase current exceeds the permissible upper limit (=+β) (see the alternate long and short dash line in FIG. 5). When the drive wheel is slipping, the alarm sound generation processing unit 241 temporarily stops adding the variation value ΔV to the d-axis voltage command value Vd that has been subjected to current feedback (Vd variation through the alarm sound generating process), and directly sets the d-axis voltage command value Vd that has been subjected to current feedback for the d-axis voltage command value Vda at the time of the alarm sound generating process. By so doing, phase currents falls within the permissible range (the range from −β to +β). As a result, an overcurrent of the motor M1 is avoided.

When the drive wheel is not slipping any longer after a temporary stop of the alarm sound generating process, the alarm sound generation processing unit 241 cancels the temporary stop of the alarm sound generating process, and resumes the alarm sound generating process. That is, when the drive wheel is in a non-slip state after a temporary stop of the alarm sound generating process, the alarm sound generation processing unit 241 cancels the temporary stop of the alarm in sound generating process, and resumes the alarm sound generating process. By so doing, an alarm sound is generated from the motor M1 again.

Figure 6:
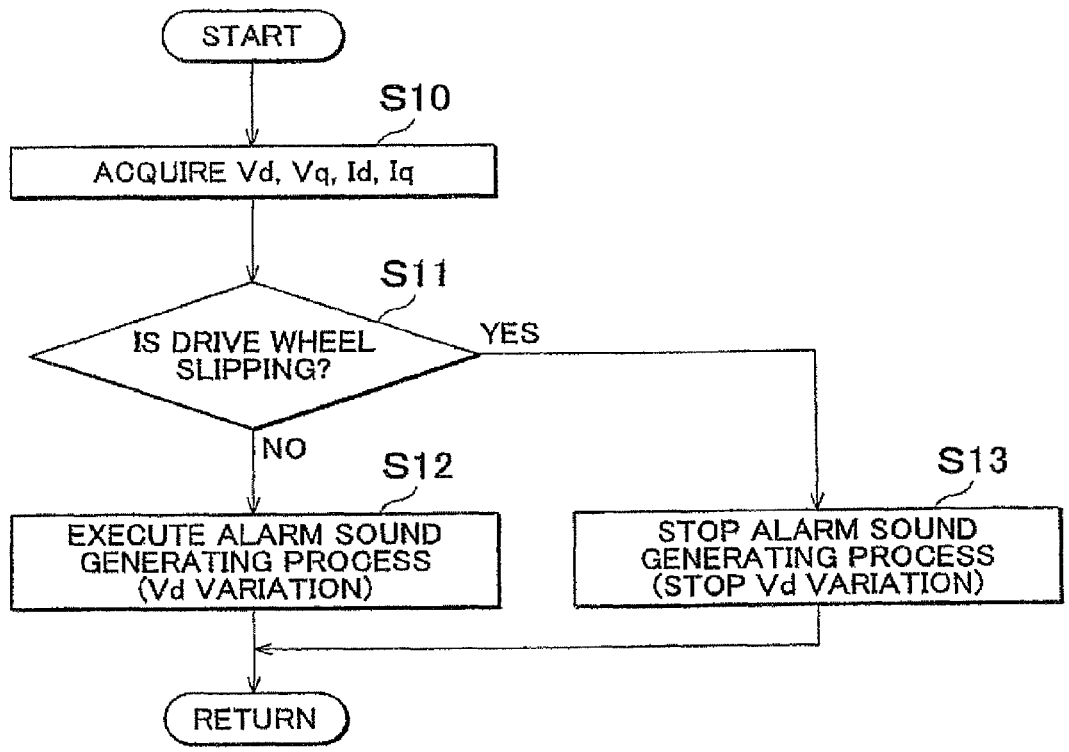
FIG. 6 is a flowchart that shows a procedure that is processed by the control device.

FIG. 6 is a flowchart that shows a procedure that is processed by the control device 30 for implementing the functions of the above-described slip determination unit 242 and alarm sound generation processing unit 241.

In step (hereinafter, step is abbreviated as "S") 10, the control device 30 acquires parameters, that is, the d-axis current Id, the q-axis current Iq, the d-axis voltage command value Vd and the q-axis voltage command value Vq.

In S11, the control device 30 determines whether the drive wheel is slipping on the basis of the acquired parameters. The determination method has been already described, so the detailed description will not be repeated.

When the drive wheel is not slipping (NO in S11), the control device 30 proceeds with the process to S12, and executes the alarm sound generating process (carries out Vd variation through the alarm sound generating process).

On the other hand, when the drive wheel is slipping (YES in S11), the control device 30 proceeds with the process to S13, and temporarily stops the alarm sound generating process (temporarily stops Vd variation through the alarm sound generating process).

As described above, the control device 30 according to the present embodiment determines whether the drive wheel is slipping on the basis of the d-axis current Id, the q-axis current Iq, the d-axis voltage command value Vd and the q-axis voltage command value Vq. That is, the control device 30 determines whether the wheel is gripping (is not slipping) on the basis of the d-axis current Id, the q-axis current Iq, the d-axis voltage command value Vd and the q-axis voltage command value Vq. When the drive wheel is not slipping, the control device 30 generates an alarm sound from the motor M1 by carrying out Vd variation through the alarm sound generating process. On the other hand, when the drive wheel is slipping, the control device 30 temporarily stops Vd variation through the alarm sound generating process. By so doing, it is possible to appropriately suppress an overcurrent of the motor due to the alarm sound generating process.

While the disclosure has been explained in conjunction with specific exemplary embodiments thereof, it is evident that may alternatives, modifications, and variations will be apparent to those skilled in the art. Accordingly, exemplary embodiments of the disclosure as set forth herein are intended to be illustrative, not limiting. There are changes that may be made without departing from the scope of the disclosure.

What is claimed is:

1. A vehicle comprising:
    an alternating-current motor that is coupled to a wheel of the vehicle; and
    a control device that controls the alternating-current motor through pulse width modulation control, wherein when the wheel is not slipping on a road, the control device varies phase current flowing through the alternating-current motor by periodically adding a variation value to a voltage command value of the alternating-current motor, so as to generates a sound from the alternating-current motor, and when the wheel is slipping on a road, the control device stops adding the variation value to the voltage command value.

2. The vehicle according to claim 1, wherein
    the time when the wheel is not slipping on a road is the time when the wheel is gripping on the road.

3. The vehicle according to claim 1, wherein
    when the wheel is in a non-slip state after the control device stops adding the variation value to the voltage command value, the control device resumes adding the variation value to the voltage command value.

4. The vehicle according to claim 1, wherein
    the voltage command value is a value that varies in response to a slip of the wheel.

5. The vehicle according to claim I, wherein
    the voltage command value is at least one of a d-axis voltage command value and a q-axis voltage command value which are obtained through current feedback control for bringing a d-axis current and a q-axis current respectively obtained through two-phase conversion from the phase currents, close to respective target values.

6. The vehicle according to claim 5, wherein
    the control device computes the d-axis current, the q-axis current, the d-axis voltage command value and the q-axis voltage command value at a period shorter than a period at which a rotation speed of the alternating-current motor is computed, and the control device determines whether the wheel is slipping on the basis of variations of at least any one of the d-axis current, the q-axis current, the d-axis voltage command value and the q-axis voltage command value.

7. A control method for a vehicle that includes an alternating-current motor that is controlled through pulse width modulation control and a wheel that is coupled to the alternating-current motor, comprising:
    determining whether the wheel is slipping on a road;
    varying phase current flowing through the alternating-current motor by periodically adding a variation value to a voltage command value of the alternating-current motor, so as to generate a sound from the alternating-current motor, when the wheel is not slipping on a road; and
    stopping adding the variation value to the voltage command value, when the wheel is slipping on a road.

* * * * *